July 24, 1928.
A. MOORE
1,678,349
ANTIDETONATING CYLINDER HEAD FOR INTERNAL COMBUSTION ENGINES
Filed Oct. 30, 1926   2 Sheets-Sheet 1
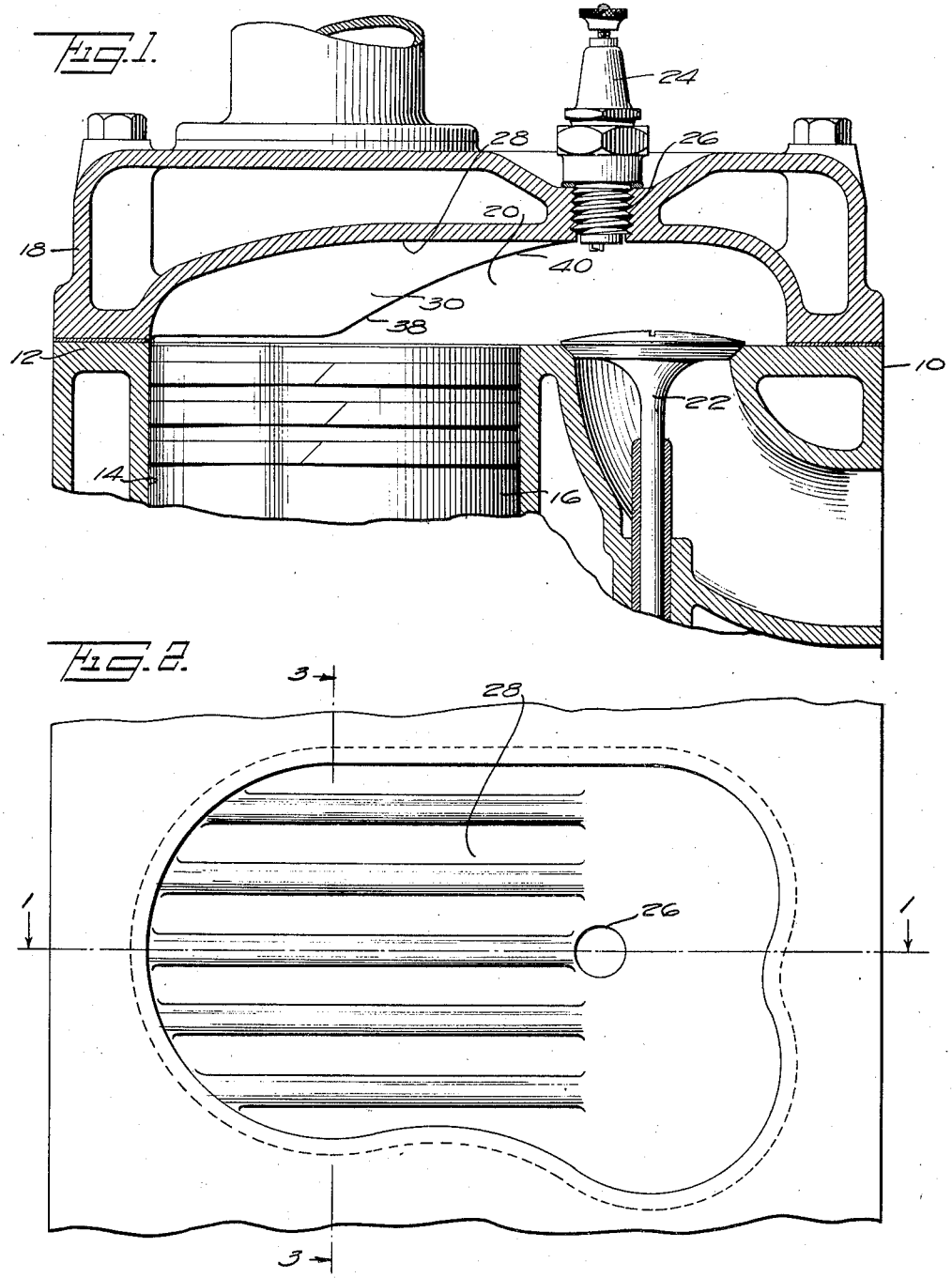
INVENTOR
ARLINGTON MOORE
BY
H. H. Dyke
ATTORNEY July 24, 1928.

A. MOORE 1,678,349

ANTIDETONATING CYLINDER HEAD FOR INTERNAL COMBUSTION ENGINES

Filed Oct. 30, 1926   2 Sheets-Sheet 2

INVENTOR
ARLINGTON MOORE
BY
H H Dyke
ATTORNEY

Patented July 24, 1928.

1,678,349

UNITED STATES PATENT OFFICE.

ARLINGTON MOORE, OF NEW YORK, N. Y., ASSIGNOR, BY MESNE ASSIGNMENTS, TO MAXMOOR CORPORATION, OF NEW YORK, N. Y., A CORPORATION OF DELAWARE.

ANTIDETONATING CYLINDER HEAD FOR INTERNAL-COMBUSTION ENGINES.

Application filed October 30, 1926. Serial No. 145,213.

My invention is of an anti-detonating cylinder head for internal combustion engines.

I make use herein of the language of vertical engines for convenience of expression, but not in a limiting sense, as the engine cylinders may be horizontal, inclined, or arranged in other ways as well as vertically.

While applicable to internal combustion engines of various forms, my invention is especially well adapted for L-head four-cycle engines.

According to this invention that part of the ceiling wall of the combustion chamber in the cylinder head which is over the cylinder bore is provided or formed with a series of elongated downwardly extending projections, which are preferably arranged in substantial parallelism to one another, and greatly increase the surface area of the combustion chamber ceiling.

These downwardly extending projections preferably project fairly close to the piston head when the latter is at its top center position, and serve practically as partitions to divide the combustion chamber into a series of smaller chambers each having its end open toward the end of the combustion chamber containing the valves and the spark plug.

Figure 3:
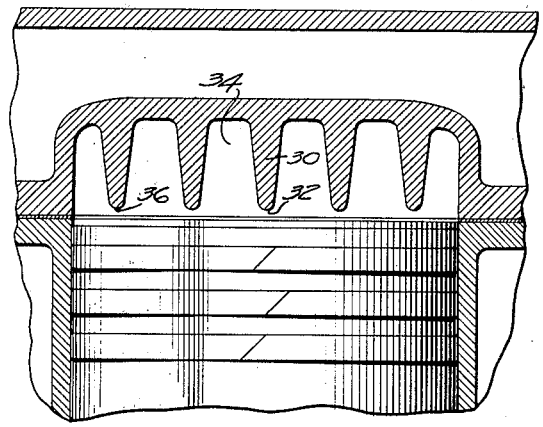
Figure 4:
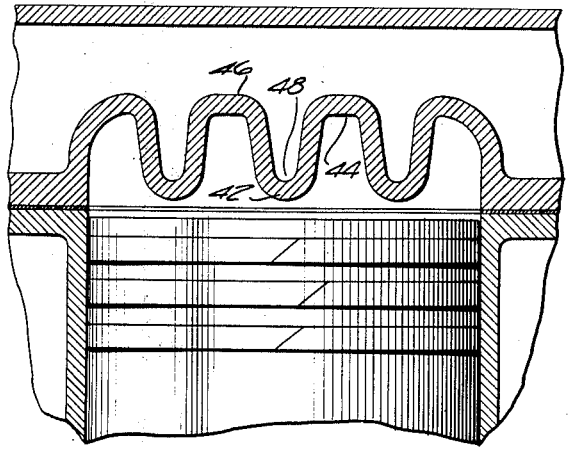

My invention will be best understood from the following description of embodiments thereof shown in the accompanying drawings in which Fig. 1 is a partial vertical sectional view of an L-head, four-cycle internal combustion engine taken on line 1—1, Fig. 2. Fig. 2 is a bottom plan view of the combustion chamber ceiling of Fig. 1. Fig. 3 is a transverse section on line 3—3, Fig. 2, and Fig. 4 is a view similar to Fig. 3 and showing a modification.

The engine 10 has a cylinder block 12 provided with the cylinder bore 14, in which the piston 16 works, a cylinder head 18 containing the combustion chamber 20, and is provided with side valves, one of which 22 is shown.

The spark plug 24 in the hole 26 is preferably arranged at the valve side of the combustion chamber and as far toward the center of the combustion chamber as possible with the substantially fluted formation of the combustion chamber ceiling of the present invention.

Over the cylinder bore 14, the combustion chamber ceiling wall 28 is provided with a series of elongated downwardly extending projections having substantially the form of ribs 30. These ribs 30 are preferably arranged substantially parallel to the major axis of the combustion chamber. They extend down relatively close to the piston head, as indicated at 32, and practically divide the end of the combustion chamber over the cylinder bore into a series of sub-chambers 34, 34, which however communicate to some extent even when the piston is at top position through the openings at 36, 36 and further at the inner ends 38 of the extensions 30, same taper off to join the principal ceiling wall, as indicated at 40, leaving therebeneath ample space for communication between the sub-chambers 34.

If desired, instead of plain ribs 30, not provided with individual cooling means, the substantially fluted arrangement of the combustion chamber ceiling wall surfaces may be provided by constructing such wall with corrugations, as shown in Fig. 4, in which downward projections 42 alternate with the recesses or chambers 44 on the combustion chamber side of the wall, and upward extensions 46 alternate with recesses 48 on the water jacket side thereof. Obviously with such arrangement, which provides for substantially uniform wall thickness and more effective cooling, the fluting will be coarser and the sub-chambers will be larger and will be reduced in number as compared with the ribs 30, which are not individually water jacketed.

The highest benefits of the present invention are realized when complete combustion and absence of carbon deposits are obtained by the use of my improved system of combustion, involving the supplying to the engine intake above the throttle of exhaust gas and air at temperatures and in proportions and quantities metered to suit the engine requirements at varying speeds and loads, as set forth, for example, in my co-pending application Serial No. 757,075, filed December 19th, 1924.

Without commitment to a particular theory, it is my belief that detonation is avoided by the breaking up and subdivision of any pressure wave that may precede the flame travel upon ignition, that if any auto-inflammation of portions of gases does take place, same is spread over a relatively extended time interval because of the varying distances and directions of the several subchambers from the point of ignition, as will be apparent from Fig. 2, that the flame travel itself is speeded up by the surface combustion effect of gas concentration on or adjacent to the extensive metallic surfaces which are interposed in the path of flame travel, and that excessive temperatures, which might give rise to detonation, are avoided by the extensive area of the combustion chamber ceiling wall operating to withdraw the excessive heat to the cooling medium, which also serves to avoid pre-ignition by withdrawal of heat from localized regions, which might otherwise reach a state of incandescence.

I claim:

1. An internal combustion engine comprising a cylinder having a combustion chamber at the end thereof extending laterally therefrom, means in the laterally extending portion of the combustion chamber for admitting a fuel charge thereto, and a plurality of rib portions projecting downwardly from the part of the ceiling of the combustion chamber over said cylinder and extending towards said laterally extending portion of the combustion chamber; said rib portions forming a series of parallel passages opening into said laterally extending portion at the ends of said passages adjacent thereto and open at the lower sides thereof.

2. An internal combustion engine comprising a cylinder having a combustion chamber at the end thereof extending laterally therefrom, means in the laterally extending portion of said combustion chamber for admitting a fuel charge thereto, and a plurality of tapering rib portions projecting downwardly from the part of the combustion chamber over said cylinder and extending substantially parallel to the major axis of the combustion chamber; said rib portions and the wall portions of the combustion chamber parallel therewith forming a series of parallel passages open at the ends thereof adjacent to said laterally extending portion, closed at the opposite ends thereof, and open at the bases thereof.

3. An internal combustion engine comprising a cylinder having a combustion chamber at the end thereof extending laterally therefrom, means in the laterally extending portion of said combustion chamber for admitting a fuel charge thereto, and a plurality of hollow rib portions projecting downwardly from the part of the ceiling of the combustion chamber over said cylinder and communicating with the water containing spaces of the engine; said rib portions being disposed substantially parallel to the major axis of said combustion chamber, and terminating adjacent to said laterally extending portion, and providing a series of parallel passages open at the ends thereof adjacent to said laterally extending portion, and open at the bases thereof.

4. In an internal combustion engine, a cylinder head having that part of the combustion chamber therein which is over the cylinder bore of substantially corrugated formation, the corrugations running lengthwise of the combustion chamber.

5. In an internal combustion engine, a cylinder head having the part of the ceiling wall of the combustion chamber therein which is over the cylinder bore of substantially fluted formation, whereby said part of the combustion chamber is substantially subdivided into a series of sub-chambers, and a spark plug in the ceiling wall adjacent to said fluted part, the sub-chambers opening toward the spark plug end and the flute members being tapered off to the general surface of the ceiling wall at the ends thereof toward the spark plug.

In testimony whereof, I have signed my name hereto.

ARLINGTON MOORE.